United States Patent
Michael et al.

(12)

(10) Patent No.: US 6,664,303 B1
(45) Date of Patent: Dec. 16, 2003

(54) METHOD OF PRODUCING AN ELASTOMERIC ALLOY THAT IS SIMILAR TO THERMOPLASTIC ELASTOMERS, ON THE BASIS OF RECLAIMED RUBBER OR WASTE RUBBER

(76) Inventors: Hannes Michael, Strasse Ustinad Labem Nr. 11, D-09119 Chemnitz (DE); Henrik Scholz, Neulaender Strasse 85, D-01129 Dresden (DE)

(*) Notice: Subject to any disclaimer, the term of this patent is extended or adjusted under 35 U.S.C. 154(b) by 0 days.

(21) Appl. No.: 09/831,438

(22) PCT Filed: May 17, 2000

(86) PCT No.: PCT/DE00/01539

§ 371 (c)(1),
(2), (4) Date: Jul. 18, 2001

(87) PCT Pub. No.: WO00/78852

PCT Pub. Date: Dec. 28, 2000

(30) Foreign Application Priority Data

May 25, 1999 (DE) .......................................... 199 23 758

(51) Int. Cl.[7] .............................. C08J 11/04; C08K 9/12
(52) U.S. Cl. ........................ 521/41; 521/42.5; 523/200; 524/525
(58) Field of Search .................. 521/41, 42.5; 524/525; 523/200

(56) References Cited

FOREIGN PATENT DOCUMENTS

| DE | 29515721 | 2/1996 |
|---|---|---|
| DE | 19607281 | 8/1997 |

OTHER PUBLICATIONS

G. Mennig et al.: "Thermoplastic Elastomers from Blends of Polypropylene and Powdered Rubber Waste" International Polymer Science and Technology, GB, RAPRA Technologies, Shropshire, Bd. 24, Nr. 11, 1997, Seiten T100–T103, XP000741364.

*Primary Examiner*—Tae H. Yoon
(74) *Attorney, Agent, or Firm*—Jordan and Hamburg LLP

(57) ABSTRACT

An elastomer blend that is similar to thermoplastic elastomers is produced from powered reclaimed rubber or waste rubber. The powdered rubber is processed to compounds by subjecting it to a melt-mixing process in a mixer together with a thermoplastic material and at least one stabilizer. A mixture that consists of two phases that are usualy incompatible, namely the powdered rubber and a thermoplastic material, is processed to a blend that is characterized by the properties of the rmoplastic elastomers. To this end, at least one polypropylene copolymer or a mixture thereof with at least one polypropylene type is melted in the mixer and powered rubber, at least part of which has been preswelled in a radical donor, is dosed to the melt. The powered rubber is dispersed in the plastic matrix by applying high shearing strains and admixing radical-forming agents in order to couple the two phase.

13 Claims, No Drawings

METHOD OF PRODUCING AN ELASTOMERIC ALLOY THAT IS SIMILAR TO THERMOPLASTIC ELASTOMERS, ON THE BASIS OF RECLAIMED RUBBER OR WASTE RUBBER

The invention relates to a method of producing an elastomeric alloy that is similar to thermoplastic elastomers using reclaimed rubber or waste rubber, in which the reclaimed rubber and waste rubber which has been converted into powdered rubber is processed with a thermoplastic and at least one stabilizer in various mass ratios by melt-mixing in a mixer to give compounds.

As a contribution to the solution of the problem of mechanical recycling of reclaimed rubber and waste rubber, a great deal of effort has been directed at the development of methods and formulations for the use of powdered rubber and granulated rubber from reclaimed or waste rubber. Such powdered rubber or granulated rubber is being offered to an increasing extent on the European market. Research work is concerned with the production, processing and testing of compounds that are similar to thermoplastic elastomers (TPEs) and are derived from powdered rubber and plastics.

The production of such elastomeric alloys by means of melt mixing with dynamic stabilization of the mixture in a mechanical mixer is known. The mechanophysical property profile of these compounds is determined by the plastic deformation behavior of the usually partially crystalline polymer matrix and the entropy-elastic, i.e. rubber-like, deformation behavior of the elastomeric domains dispersed therein.

Thus, for example, DE 295 15 721 U1 discloses the mixing of powdered rubber into polypropylene. The publication describes a thermoplastic, preferably polypropylene, styrene-butadiene-styrene or styrene-ethylene-butylene-styrene, modified with ground rubber as a substitute for or blending component for thermoplastic elastomers or impact-modified thermoplastics, which is characterized in that from 10 to 80 percent by weight of finely ground rubber having a particle size of <600 $\mu$m is physically incorporated in the matrix of the thermoplastic. Additional chemical bonding is achieved by means of peroxidic crosslinking or acid functionalization.

However, both the process technology employed there and the formulation are not sufficient for producing a level of mechanophysical materials properties which is similar or comparable to that typical for known elastomeric alloys.

While DE 295 15 721 U1 uses antioxidants for protection against light and heat, antioxidants are, in further known processes, of great importance for significantly increasing strength and hardness values by means of a donor-acceptor reaction.

Thus, DE 196 07 281 A1 discloses methods and formulations by means of which it is possible to produce elastomer compounds which have a level of materials properties, in particular mechanophysical properties, which is significantly improved compared to the known prior art. According to this publication, the method is based on converting the mixture of at least two intrinsically incompatible mix constituents, namely powdered rubber and thermoplastic, into a compound having good impact toughness, by creation of appropriate materials, technological and constructional conditions during the melt-mixing process. For this purpose, untreated and/or activated powdered reclaimed or waste rubber and a thermoplastic component are introduced into a mechanical mixer, the thermoplastic component is plasticized and at the same time the powdered rubber is dispersed or mixed in. Addition of one or more crosslinkers in various mass ratios and the action of high shear forces result in dynamic stabilization of the elastomer and/or thermoplastic components and conversion into compounds having properties similar to those of thermoplastic elastomers.

A disadvantage of this solution is that homogeneous distribution of the crosslinker is not ensured and, as a result, stable reproducibility of equal quality compounds over a longer period of time is not guaranteed.

It has also been found that not every thermoplastic material is equally suitable for producing high-quality and multiply recyclable compounds, since the achievable degree of crosslinking of the thermodynamically incompatible components is very different.

It is therefore an object of the invention to improve known methods of mechanical recycling of reclaimed rubber and waste rubber by dynamic stabilization of powdered rubber, thermoplastic and crosslinkers in the manner described at the outset so that a mixture of two intrinsically incompatible phases, namely powdered rubber and thermoplastic, is converted during a relatively short mixing time in a melt-mixing process into an alloy which has properties similar to those of thermoplastic elastomers and is of constant, reproducible quality and is multiply recyclable by appropriate materials selection for the thermoplastic component and further additives and by improved technology of the process. In particular, the compounds should have rubber-like materials properties and constant good quality.

According to the invention, this object is achieved in that at least one polypropylene copolymer or a mixture thereof with at least one polypropylene grade is firstly melted in a mixer and powdered rubber of which at least part has been preswelled in a free-radical donor is metered into the melt, in that the powdered rubber is dispersed in the polymer matrix by application of high shear deformations and with mixing-parameter-dependent addition of free-radical-forming agents for phase coupling between the powdered rubber and the polypropylene copolymer or mixture thereof and in that the dynamic stabilization process is carried out at a mix temperature which is above the melting point range of the polypropylene copolymer or mixture thereof but below the decomposition temperature range of the powdered rubber and at a mixing time which allows reaction of the free-radical former.

These elastomeric alloys which can be produced by the method of the invention combine the advantages of thermoplastic processability with rubber-like materials properties. These elastomeric alloys are very similar to thermoplastic elastomers. A polypropylene copolymer having a proportion of polyethylene or a mixture of partially crystalline polypropylenes (homopolymer and copolymer) functions as polymer phase. Since the method concentrates on the mechanical recycling of reclaimed rubber and waste rubber, the formulation development is based on a mixing ratio of powdered rubber to polymer of at least 50% of powdered rubber. The elastomeric alloys can be produced reproducibly in terms of their mechanophysical property profile and have a property structure which can be correlated amongst them.

The elastomeric alloys are recyclable, i.e. they can, in contrast to rubber, be processed a second or further time without appreciable loss of properties.

The novel aspect of the procedure is the introduction and utilization of the affects of dynamic stabilization of the polymer mixture. High-quality bonding of the two phases can be achieved only by a combination of mechanical energy input and chemical reaction after preswelling of the disperse phase. The polyethylene component migrates to the phase boundary and displays crosslinking and coalescence effects there. Thus, high proportions of, for example, powdered reclaimed tires having a coarse structure (particle size at least 0.5 mm) can be used and converted into compounds having very good mechanophysical properties. The pre-swelling of the powdered rubber serves to restrict the attack of the free-radical donor on the phase boundaries.

The mixture of powdered rubber, a specifically selected polymer and the stabilizer or the additives is brought, in a mixer suitable for applying high shear deformations, here a mechanical mixer, to an energy level at which the thermoplastic component is melted and the elastomer component is dispersed in it. The achievable property spectrum of these compounds can be varied within wide limits as a function of the formulation, i.e. the mass ratio of powdered rubber to polymer and further additives, and also the mixing technology and can be tailored to the respective use of the polymer alloy.

The compounds can be used as molding compositions, in particular for industrial moldings. Owing to their good mechanophysical properties, particularly in respect of their tensile strength and elongation at break and also their resistance to impact and shock even at low temperatures, they can be used for industrial molded articles subject to high stresses and can thus provide an inexpensive and environmentally friendly replacement for conventional thermoplastic elastomers comprising a pure polymer with a crosslinked or uncrosslinked pure rubber phase.

Typical examples of applications are semifinished parts or moldings which as sleeves and seals and also shock absorbers and linings in motor vehicle and rail vehicle construction. Containers, buckets or covers in road and pipeline construction, produced by injection molding, extrusion, rolling, calendering or pressing, can also be manufactured inexpensively from these compounds.

In an advantageous embodiment of the method of the invention, at least a proportion of at least one polypropylene homopolymer is added during melting of the polypropylene copolymer.

In this way, hardness and strength, in particular the abrasion resistance, of the stabilized system can be increased further.

Furthermore, the invention provides for use of a polypropylene blend comprising a mixture of copolymer and homopolymer and having a copolymer content of up to 95% of the total polymer matrix as thermoplastic.

This, too, can improve the mechanophysical properties, here impact strength when used at low temperature and elongation at break at room temperature. The compounds have significantly better flowability, which aids processing conditions, particularly in injection molding and extrusion.

If the free-radical donor used is a liquid peroxide having a high proportion of active oxygen and a weight ratio to the polymer component of >0.3%, this leads to improved crosslinking of the components of the mixture.

The high proportion of active oxygen contributes to a very active reaction. The effective surface area of the dispersed elastomeric phase is increased by swelling and free-radical formation is effected at the powdered rubber surface by means of partial breaking of crosslinks or cleavage of double bonds still present in the rubber. The proportion of polyethylene present in the copolymer is crosslinked by means of the peroxide. The degree of grafting is a function of the reactivity of the peroxide.

In terms of the achievable mechanophysical properties, it is also advantageous for the matrix to be exclusively a polypropylene-co-polyethylene.

The surface tensions of the materials to be mixed should generally be very close to one another. Polyethylene has a significantly lower surface tension than polypropylene and is far closer to the surface tension of natural rubber as constituent of the powdered rubber. It is therefore better able to bond to the powdered rubber.

In a further preferred embodiment of the method of the invention, free-radical acceptors are added at a point in time dependent on the half-life of the free-radical donor so as to increase the hardness and strength of the compounds.

This increases, in particular, hardness and strength of the compound. Degradation of the matrix is stopped and undesirable destruction of the matrix is prevented.

If sulfur, sulfur-containing or sulfur-donating substances and/or other polyfunctional compounds such as quinones or quinolines are added as free-radical acceptors before and/or during the melt-mixing process, this likewise serves to further improve or stabilize the mechanophysical properties of the compound. Uncontrolled degradation of polypropylene is prevented in a lasting manner.

The invention also provides for substances having, in particular, a regenerative action on the powdered rubber to be added prior to addition of the freeradical donor-acceptor system.

The substances having a regenerative action can be mercaptobenzothiazole (MBT) or pentachlorothiophenol or dibenzoylamidodiphenyl disulfite.

This additional activation of the powdered rubber as a result of cleavage of the carbon chains increases the number of bonding-active sites on the powdered rubber.

An additional stabilizing effect is achieved by using the powdered rubber in various particle sizes, untreated or activated by mechanical and/or chemical and/or chemophysical methods, as rubber phase and formulation component.

The use of coarser powdered rubber minimizes the technological outlay for producing the powdered rubber and the powdered rubber is cheaper to use. The procedure nevertheless makes it possible to achieve the good mechanophysical properties.

Powdered rubber having a particle size in the range up to 1 mm is advantageously used and gives the same good properties.

If further additives such as fillers, plasticizers, resins, fresh rubber and rubber mixtures, dyes or pigments or compatibilizers are added before or during the melt-mixing process, this measure serves to realize specific customer wishes, matched to the respective actual use conditions.

It is advantageous, particularly for reasons of environmental protection, that the polypropylene or the copolymer of polypropylene and polyethylene can be used either as pure primary or secondary plastic or in admixture with other thermoplastics or blend fractions.

The recyclability of the compounds is maintained with virtually no deterioration in properties; the compounds are reusable over a long period and thus do not pollute the environment.

The method of the present invention is described in more detail below.

Firstly, to aid the action of the free-radical donor, a particular amount of powdered rubber is preswelled by means of this, preferably in liquid form. This efficient, specific synergy creates the conditions for in-situ block copolymer formation and stabilization by co-crosslinking of the two phases powdered rubber and polymer. The specific mixing process necessary for this purpose is achieved in a mechanical mixer. Here, physical processes, i.e. dispersion processes, and chemical processes, i.e. stabilization processes, occur at the same time. This results in the structure of the compounds which is characterized by rubber domains dispersed in a thermoplastic matrix.

The mixing process is characterized by a specific characteristic of the most important process parameters, namely drive power and mix temperature. The typical course of these process parameters over the mixing time is also the reason for the method being termed dynamic stabilization.

After a first power peak, which occurs after addition of the main components powdered rubber and thermoplastic and after closing the lid of the mechanical mixer, further stabilizing chemicals or additives are added. After the lid has been closed again, another power or temperature rise is observed. This second power maximum is due to a chemical reaction, i.e. a phase-coupling or stabilization process, having taken place in the mixture of powdered rubber and polymer. Immediately thereafter and within a precisely defined temperature range, the process is stopped and the compound is discharged. Continuation of the mixing process can lead to better uniformity of the elastomeric alloy.

Use of the dynamic stabilization method makes it possible to stabilize intrinsically incompatible phases, in this case powdered rubber and polymer, in the compound in such a way that demixing phenomena do not occur in subsequent processing and during cooling, i.e. during injection molding or extrusion, and the elastomeric alloy displays specific mechanophysical properties.

The range of effects achievable by the method of the invention can be expanded by use of various stabilization systems, plasticizers, reinforcing fillers and other additives. The use of specific compatibilizers additionally reduces the unavoidable increase in modulus at the phase boundaries of the two main components of the polymer alloy, namely powdered rubber and specific polymer.

Test specimens produced by conventional injection-molding technology display not only good thermoplastic processability but also a specific property profile close to that of rubber. Compounds produced according to the invention, from which test specimens in the form of tensile bars were produced by means of injection molding, were able to achieve elongations at break of >250% and tensile strengths of >15 MPa when using powdered rubbers having a particle size of about 0.5 mm. The tensile set determined indicates that these materials having tensile set values of <50% are, on the basis of DIN 7724, thermoplastic elastomers (TPEs). Simple mixing of powdered rubber and polypropylene results in tensile strengths of <13 MPa and elongations at break of <60%.

Comparisons with materials available on the market and classified as thermoplastic elastomers show that approximately equal materials properties can be achieved by means of stabilized compounds. They can therefore be advantageously used for, in particular, production of industrial moldings in motor vehicles, building and construction or agriculture.

What is claimed is:

1. A method of producing an elastomeric alloy that is similar to thermoplastic elastomers using reclaimed rubber or waste rubber, in which the reclaimed rubber and waste rubber which has been converted into powdered rubber is processed with a thermoplastic and at least one stabilizer in various mass ratios by melt-mixing in a mixer to give compounds, wherein at least one polypropylene copolymer or a mixture thereof with at least one polypropylene grade is firstly melted in a mixer and powdered rubber of which at least part has been preswelled in a free-radical donor is metered into the melt, and the powdered rubber is dispersed in the polymer matrix by application of high shear deformations and with mixing-parameter-dependent addition of free-radical-forming agents for phase coupling between the powdered rubber and the polypropylene copolymer or mixture thereof and the dynamic stabilization process is carried out at a mix temperature which is above the melting point range of the polypropylene copolymer or mixture thereof but below the decomposition temperature range of the powdered rubber and at a mixing time which allows reaction of the free-radical former.

2. A method as claimed in claim 1, wherein at least a proportion of at least one polypropylene homopolymer is added during melting of the polypropylene copolymer.

3. A method as claimed in claim 2, wherein the thermoplastic used is a polypropylene blend comprising a mixture of copolymer and homopolymer and having a copolymer content of from 1 to 95% of the total polymer matrix.

4. A method as claimed in claim 1, 2 or 3, wherein the free-radical donor used is a liquid peroxide having a high active oxygen content and a weight ratio to the polymer of >0.3%.

5. A method as claimed in any of claims 1 to 3, wherein polyethylene is used as copolymer constituent.

6. A method as claimed in any of claims 1 to 3, wherein free-radical acceptors are added at a point in time dependent on the half-life of the free-radical donor so as to increase the hardness and strength of the compounds.

7. A method as claimed in claim 6, wherein sulfur, sulfur-containing or sulfur-donating substances and/or other polyfunctional compounds comprising quinones or quinolines are added as free-radical acceptors before and/or during the melt-mixing process.

8. A method as claimed in claim 6, wherein substances having, in particular, a regenerative action on the powdered rubber are added prior to the addition of the free-radical donor-acceptor system.

9. A method as claimed in claim 8, wherein the substances having a regenerative action which are used are mercaptobenzothiazole (MBT) or pentachlorothiophenol or dibenzoylamidodiphenyl disulfite.

10. A method as claimed in any of claims 1 to 3, wherein the powdered rubber is used in various particle sizes, untreated or activated by mechanical and/or chemical and/or chemophysical methods, as rubber phase and formulation component.

11. A method as claimed in claim 10, wherein the powdered rubber has a particle size in the range up to 1 mm.

12. A method as claimed in any of claims 1 to 3, wherein further additives comprising fillers, plasticizers, resins, fresh rubber and rubber mixtures or compatibilizers are added before or during the melt-mixing process.

13. A method as claimed in any of claims 1 to 3, wherein the polypropylene or the copolymer of polypropylene and polyethylene can be used either as pure primary or secondary polymer or in admixture with other thermoplastics or blend fractions.

* * * * *